United States Patent [19]

Whysall

[11] Patent Number: 4,482,361
[45] Date of Patent: Nov. 13, 1984

[54] PRESSURE SWING ADSORPTION PROCESS

[75] Inventor: Michael Whysall, Wilrijk, Belgium

[73] Assignee: Union Carbide Corporation, Danbury, Conn.

[21] Appl. No.: 457,915

[22] Filed: Jan. 14, 1983

[51] Int. Cl.³ .............................................. B01D 53/04
[52] U.S. Cl. .......................................... 55/26; 55/62; 55/68; 55/75
[58] Field of Search ................... 55/25, 26, 58, 62, 68, 55/75, 179, 389

[56] References Cited

U.S. PATENT DOCUMENTS

| | | | |
|---|---|---|---|
| 3,085,379 | 4/1963 | Kiyonaga et al. | 55/58 X |
| 3,226,914 | 1/1966 | Greismer et al. | 55/58 |
| 3,430,418 | 3/1969 | Wagner | 55/25 |
| 3,788,037 | 1/1974 | Shell et al. | 55/58 |
| 3,986,849 | 10/1976 | Fuderer et al. | 55/25 |
| 4,021,210 | 5/1977 | Streich et al. | 55/26 |
| 4,259,091 | 3/1981 | Benkmann | 55/25 |
| 4,340,398 | 7/1982 | Doshi et al. | 55/25 |
| 4,381,189 | 4/1983 | Fuderer | 55/26 |

FOREIGN PATENT DOCUMENTS 0022603  1/1981  European Pat. Off. .

Primary Examiner—Robert Spitzer
Attorney, Agent, or Firm—Alvin H. Fritschler

[57] ABSTRACT

Pressure swing adsorption operations for the selective adsorption of a component of a gas mixture is carried out, in multi-bed systems, so that the gas released from a bed during the cocurrent depressurization, provide-purge step is passed partly to another bed and partly to an external vessel. The gas in said vessel is thereafter used to partially repressurize said other bed after it has completed its purge step.

15 Claims, No Drawings

PRESSURE SWING ADSORPTION PROCESS

BACKGROUND OF THE INVENTION

1. Field of the Invention

The invention relates to the purification of gases in a pressure swing adsorption system. More particularly, it relates to the improvement of product recovery and/or purity in such a system.

2. Description of the Prior Art

The pressure swing adsorption (PSA) process provides a commercially desirable technique for separating and purifying at least one gas component from a feed gas mixture of said gas component and at least one selectively adsorbable component. Adsorption occurs in an adsorbent bed at a higher adsorption pressure, with the selectively adsorbable component thereafter being desorbed by pressure reduction to a lower desorption pressure. The PSA process is commonly employed in multi-bed systems as is indicated by the Wagner U.S. Pat. No. 3,430,418, relating to a system having at least four beds, and by the Fuderer, et al U.S. Pat. No. 3,986,849, which discloses the use of at least seven adsorbent beds. As is generally known and described in these patents, the PSA process is commonly carried out, on a cyclic basis, in a processing sequence that includes, in each bed, higher pressure adsorption with the release of product effluent from the product end of each bed, cocurrent depressurization to intermediate pressure with release of void space gas from the product end of the bed, countercurrent depressurization to a lower desorption pressure, purge and repressurization. The void space gas released during the cocurrent depressurization step is commonly employed for pressure equalization purposes and to provide purge gas to a bed at its lower desorption pressure.

Multi-bed systems have the inherent advantage of greater productivity coupled with a substantially uniform flow of product effluent therefrom. The necessary cycling of the processing sequence from one bed to another is recognized, however, as creating conditions that somewhat limit the recovery of product from such systems. Such a loss of product gas, while tolerable in light of the overall objects of particular commercial applications of the PSA process and system is nevertheless undesired.

It is an object of the invention, therefore, to provide an improved PSA process and system.

It is another object of the invention to provide a PSA process and system having improved product recovery.

SUMMARY OF THE INVENTION

The PSA process and system of the invention are employed so that the void space gas released from each bed during the cocurrent depressurization, provide-purge gas step is used partly for passage directly to another bed for such purge purposes and partly for passage to an external vessel. The gas thus passed to the external vessel is thereafter used to provide repressurization gas to said other bed after it completes its purge step.

DETAILED DESCRIPTION OF THE INVENTION

The objects of the invention are accomplished by the addition of a pressure equalization step for partial repressurization of a purged bed using gas recovered in an external vessel simultaneously with the providing of purge gas to said bed.

The PSA process and system of the invention relates to such conventional PSA technology in which each adsorbent bed of the system undergoes on a cyclic basis, higher pressure adsorption, cocurrent depressurization to intermediate pressure levels with release of void space gas from the product end of the bed, countercurrent depressurization to a lower desorption pressure with the release of desorbed gas from the feed end of the bed, purge and repressurization to said higher adsorption pressure. As is disclosed in the patents referred to above, a portion of the void space gas released from one bed during its cocurrent depressurization is commonly passed, directly or through external storage tanks, to a bed or beds initially at lower pressure to equalize the pressure between said beds, i.e., in one or more pressure equalization steps. Another portion of said void space gas is used to provide purge to a bed undergoing the purge step. For this purpose, the released void space gas can advantageously be passed directly from the bed undergoing cocurrent depressurization to the bed being purged. Alternatively, the prior art has employed systems in which said released void space gas is passed, not directly to another bed, but to an external storage tank for passage therefrom to the bed to be purged, typically at an economic penalty vis-a-vis direct pressure equalization and provide-purge systems.

In the practice of the invention, a portion of the released void space gas that is to be used for purge purposes is introduced, as in the patents referred to above, directly into an adsorbent bed that is to be purged at that point in the processing cycle of the overall PSA system. The remaining portion of released void space gas, however, is simultaneously introduced into an external vessel. Such gas is thereafter passed from the external vessel, as purge gas, to the same adsorbent bed that received a portion of said void space gas directly as purge gas.

The invention can advantageously be practiced in multi-bed PSA systems having at least four adsorbent beds therein, preferably in systems having from five to eight adsorbent beds, although the invention can also be used in systems having a larger number of beds. It will be understood that, in such multi-bed systems, the feed gas may be passed to more than one bed at any particular stage of the processing cycle. Thus, the feed gas is often passed to at least two beds at any given time in the operation of such multi-bed systems. As indicated above with respect to conventional practice and the practice of the invention, the PSA process desirably employs, in multi-bed operations, one, two, three or more pressure equalization steps in which cocurrent depressurization gas released from one bed at an elevated pressure is used to partially repressurize another bed initially at lower pressure. Thus, the invention can be used in a variety of processing cycles such as, for example, those involving five adsorbent beds, with two on adsorption at any time, and one pressure equalization step, those involving six adsorbent beds with two on adsorption at any time, and two pressure equalization steps, and those involving eight adsorbent beds, with two on adsorption at any time and three pressure equalization steps. Those skilled in the art will appreciate that various other PSA processes and systems can be adapted so as to take advantage of the desirable benefits of the invention.

The practice of the invention can be illustrated by the Table below with respect to a six bed embodiment of the invention:

TABLE

Bed No.      Cycle (622) E/PP

| Bed | Cycle steps |
|---|---|
| 1 | A \| 1 \| 2 \| E/PP \| D \| P \| 3 \| 2 \| / \| 1 \| R |
| 2 | 1 \| R \| A \| 1 \| 2 \| E/PP \| D \| P \| 3 \| 2 \| / |
| 3 | 3 \| 2 \| / \| 1 \| R \| A \| 1 \| 2 \| E/PP \| D \| P |
| 4 | D \| P \| 3 \| 2 \| / \| 1 \| R \| A \| 1 \| 2 \| E/PP |
| 5 | 1 \| 2 \| E/PP \| D \| P \| 3 \| 2 \| / \| 1 \| R \| A |
| 6 | A \| 1 \| 2 \| E/PP \| D \| P \| 3 \| 2 \| / \| 1 \| R \| A |
| External Vessel | E \| /F \| /E \| /F \| /E \| /F \| /E \| /F \| /E \| /F \| /E \| /F \| /E \| /F \| / |

In this Table with respect to each bed, A represents an adsorption step at a high adsorption pressure; the numeral 1 represents a cocurrent depressurization-pressure equalization step between a bed that has just completed its adsorption step and is being depressurized and a partially repressurized bed that has completed its repressurization step 2 and is initially at a lower pressure than said bed being depressurized; 2 represents a second cocurrent depressurization-pressure equalization step between a bed that has completed its step 1 depressurization and is being further depressurized and a partially repressurized bed that has completed its repressurization step 3 in which a portion of the void space gas released from the product end of a bed is passed directly to another bed undergoing its purge step and the remaining portion of said gas is simultaneously introduced into an empty external vessel for the repressurization or filing thereof; D represents a countercurrent depressurization step in which gas is released from the feed end of the bed; P represents a purge step at lower desorption pressure in which void space gas released from another bed during its E/PP step is passed directly to the bed undergoing said purge step; 3 represents an indirect pressure equalization step in which void space gas previously introduced into the external vessel during the E/PP step in one bed is passed therefrom during an emptying step therein and is passed to the bed into which void space gas was passed directly during said E/PP step for the repressurization thereof, with said step 3 occurring immediately after said bed has completed its purge step P; and R represents repressurization to higher adsorption pressure. In the Table with respect to the external vessel, E represents external vessel emptying and F represents external vessel filling. In the process of the embodiment illustrated in the Table, it will be seen that two of the six beds are in their adsorption step, in overlapping sequence, at any given time in the cycle. As two direct pressure equalization steps are employed, i.e. steps 1 and 2, the overall cycle is referred to in the heading of the Table as a (622) E/PP cycle, the 6 representing the number of beds, the first 2 representing the number of beds on adsorption, the second 2 representing the number of direct pressure equalization steps, and E/PP denoting the point of novelty of the invention wherein a portion of the cocurrent depressurization, provide-purge gas passes directly from one bed to another for such purge purposes, while another portion passes simultaneously to an empty external vessel for subsequent use as repressurization gas as described above. An eight bed system having two beds on adsorption and two direct pressure equalizations would thus similarly be referred to as having an (822) E/PP cycle.

In the processing cycle illustrated in the Table, the cocurrent depressurization, provide-purge step of bed 1 involves passing released void space gas directly from the product end of bed 1 to the product end of bed 6, i.e. to the fifth higher numbered bed, to provide purge gas for said bed 6, which is on its purge step following step D. At the same time, released void space gas from bed 1 is introduced into an empty external vessel for the repressurization thereof. During the initial portion of countercurrent depressurization step D in bed 1, void space gas is passed from the thus repressurized external vessel drum to said bed 6 for partial repressurization purposes. After countercurrent depressurization step D in bed 1, void space gas is passed from the external vessel to bed 1 for initial repressurization purposes. In the illustrated embodiment, it will be seen that the void space gas used to fill and repressurize the empty external vessel, for subsequent use in partially repressurizing bed 1, comes from bed 2. Thus, a part of the void space gas from bed 2 is used indirectly to partially repressurize the fifth higher numbered bed as the numbering reverts to bed 1 after bed 6 in cyclic operations. Similarly, each bed passes void space gas to the third higher numbered bed during direct pressure equalization step 1, and to the fourth higher numbered bed during said direct equalization step 2. Similarly, it will be seen that each bed passes void space gas directly to the fifth higher numbered bed during the direct provide purge portion of the E/PP step of the invention. It will also be seen that, in the illustrated cycle, each bed undergoes an idle or delay period between repressurization steps 2 and 1. The (622) E/PP embodiment of the invention has costs and performance characteristics essentially equivalent to those obtainable in a ten bed Fuderer et al system.

Those skilled in the art will appreciate that various changes and modifications can be made in the details of the PSA process and system as herein described without departing from the scope of the invention as recited in the appended claims. Thus, while the invention has been described in particular with reference to a desirable six bed system, it will be appreciated that other systems having a different number of beds in the system can be employed, and that various PSA processing features can be incorporated with any particular cycle or system incorporating the particular E/PP step as herein disclosed and claimed. In applying the invention generally, it will readily be appreciated that PSA systems necessarily incorporate various conduits, valves and other control features to accomplish the necessary switching of the adsorbent beds from one processing step to the next in appropriate sequence. The invention employs conventional conduits and control features well known in the art, as indicated by reference to the patents referred to above. For purposes of the invention, it will be understood that the external vessel is employed together with means, i.e. conduits and suitable conventional controls, for passing a portion of the void space gas released during the cocurrent depressurization, provide-purge step to said external vessel for repressurization of the empty vessel simultaneously with the introduction of the remaining portion of said released void space gas directly into a bed to be purged through conventional conduit means. Means are similarly provided for passing void space gas from said external vessel to the same bed purged by the remaining portion of said void space gas, and for passing feed gas to two or more adsorbent beds at all stages of the processing cycle, and to accomplish other desired processing steps in particular embodiments of the invention.

The pressure swing adsorption process and system herein disclosed and claimed can be advantageously employed to selectively adsorb at least one component of a feed gas mixture, thereby separating and purifying a desired product effluent gas. For example, the invention can be used to advantage in separating and purifying hydrogen present as a major component of a feed gas mixture also containing carbon dioxide as a selectively adsorbable component, commonly together with one or more additional minor components to be removed as undesired impurities, such as nitrogen, argon, carbon monoxide, light saturated and unsaturated hydrocarbons, aromatics, light sulfur compounds and the like. Those skilled in the art will appreciate that the invention can also be advantageously employed for other desirable separations in which at least one component of a feed gas mixture is selectively adsorbed in an adsorption system of the type herein described. The separation and purification of oxygen from air, and methane purification from mixtures thereof with carbon dioxide, ammonia, hydrogen sulfide and the like, or from other heavier hydrocarbon gases, are examples of other applications of the invention. It should be noted that the PSA process in general, and the invention in particular, can be carried out using any suitable adsorbent material having a selectivity for one component of a feed gas mixture over another, as for the impurity over the desired product gas. Suitable adsorbents include zeolitic molecular sieves, activated carbon, silica gel, activated alumina and the like. Zeolitic molecular sieve adsorbents are generally desirable in the separation and purification of hydrogen contained in mixtures thereof with carbon dioxide, nitrogen and the like. Further information concerning suitable adsorbents, including such zeolitic molecular sieves is contained in the Kiyonaga U.S. Pat. No. 3,176,444, and various other patents such as those referred to above.

As was indicated above, various changes and modifications can be made in the PSA process and system to which the invention is directed without departing from the scope of the invention as herein disclosed and claimed. Thus, the manner in which the pressure equalization steps are carried out, i.e., either directly or indirectly through external equalization vessels, the number of such equalizations, the manner in which repressurization to higher adsorption pressure, i.e., by feed gas or by a portion of the product effluent from the system, is not critical to the invention or to the obtaining of the benefits therefrom. In this regard, it should also be noted that, while the purge step has been described herein as occurring at the lower desorption pressure, those skilled in the art will appreciate that the purge step can be carried out at a pressure above said lower desorption pressure, although it is more commonly carried out after countercurrent depressurization to a lower desorption pressure.

In an illustrative example of the invention, it has been found that a particular (622) E/PP system can be used to achieve a performance approaching that of a conventional (10,3,3) Fuderer et al system at a relatively small incremental cost over that of a conventional six bed system employing direct equalizations without the use of an external vessel. In the operation of such a system with the higher adsorption pressure being about 290 psia, cocurrent depressurizations down to about 35 psia and a countercurrent depressurization or blowdown, i.e., waste, pressure of about 21 psia, recovery of product hydrogen of 99.99+% purity is on the order of 87.5%. By contrast, the use of only two direct pressure equalization steps, without the indirect repressurization provided by the E/PP and indirect pressure equalization 3 steps of the invention, there is too much gas storage in each bed, so that either the countercurrent depressurization, i.e. dump, step or the purge step must be increased. In either case, product recovery is necessarily reduced. Conversely, if a system employing three direct pressure equalizations were to be employed, there would be too little gas storage, and product gas would have to be used for providing purge purposes, again reducing product recovery. It would also appear that, for a three direct pressure equalization system of comparable performance, a minimum of eight adsorbent beds would be required, rendering the system economically unattractive as compared with the six bed (622) E/PP system of the invention.

In an alternative approach, it is possible to employ the void space gas released from each bed during its cocurrent depressurization steps for (1) a first direct pressure equalization step, (2) a second direct pressure equalization step, (3) a provide-purge gas step, and (4) a third direct pressure equalization step. Such an approach, however, has attendant disadvantages. For example, in the third equalization step following the purge step, the least pure gas is being used for repressurization rather than for purge and bed regeneration. In addition, no waste gas flows into the waste surge drum during part of the processing cycle. This circumstance necessitates the use of higher purge pressures into the waste surge drum with an accompanying decrease in product recovery.

By comparison, the practice of the invention enables the void space gas used for a third pressure equalization to be taken into an external vessel during the early part of the cocurrent depressurization, provide-purge gas step, with the gas then being passed from said external vessel to the same bed as is purged with said provide-purge gas for partial repressurization thereof. The invention has very significant advantages compared to the use of a third direct pressure equalization after the cocurrent depressurization, provide-purge step. Thus, the gas employed for the third pressure equalization is purer than the purge gas. In addition, those skilled in the art will appreciate from a review of the Table that a continuous waste gas flow to a waste surge drum occurs in the system, as all points in the processing cycle, have either a countercurrent depressurization step D or a purge step P in which a waste gas is produced and is passed to such waste surge drum. Because the surge drum does not have to accumulate gas for periods in which there is no purge or waste effluent, the average purge pressure is lower than for the indicated alternative approach in which a third pressure equalization is employed after the cocurrent depressurization, provide-purge gas step. In a further advantage, the practice of the invention enables the purge step to be longer, and the pressure drop for purge purposes to be lower than in said alternative approach, further enhancing product recovery and/or purity. Additionally, it is found that the external vessel employed in the practice of the invention is relatively small, i.e. from less than 50% of an adsorber bed volume up to one bed volume. As such, the external vessel is smaller than the difference in waste surge drum size between the lower requirements of the invention and the higher requirements of the alternative approach. This factor further enhances the overall technical-economic benefits obtainable by the use of the process and system of the invention.

The invention enables pressure swing adsorption performance characteristics to be enhanced in systems having a lesser number of adsorbent beds, and favorable overall costs, compared with the practices of the highly desirable process of the Fuderer et al patent referred to above. A highly desirable processing flexibility is thereby provided, so as to enable the advantageous pressure swing adsorption technology to be even more precisely adapted to the requirements of a given application than has heretofore been possible. The invention thus contributes in a very significant manner to the desired development of PSA processes and systems in meeting the ever more restrictive overall requirements of industrial gas separation and purification operations.

I claim:

1. In a pressure swing adsorption process for the selective adsorption of at least one component of a feed gas mixture in an adsorption system having at least four adsorbent beds, each of which undergoes, on a cyclic basis, (1) higher pressure adsorption, (2) cocurrent depressurization from said higher pressure to upper intermediate pressure(s) with release of void space gas from the product end of the bed, said gas being passed directly to another bed(s) in the system and initially at a lower pressure than said upper intermediate pressure(s) for pressure equalization therebetween (3) further cocurrent depressurization from said upper intermediate pressure reached at the completion of step (2) above to a lower intermediate pressure with release of additional void space gas from the product end of the bed, said gas being passed directly to another bed in the system at its lower desorption pressure to provide purge gas directly to said other bed to be purged, (4) purge, in which void space gas released from another bed is passed directly thereto, with or without prior countercurrent depressurization to a lower desorption pressure, (5) partial repressurization to said upper intermediate pressure(s) by the addition of void space gas thereto, said gas being passed to the bed from another bed(s) in the system and initially at a higher pressure than said upper intermediate pressure(s) for pressure equalization therebetween and (6) final repressurization to said higher adsorption pressure from the upper intermediate pressure reached upon completion of said pressure equalization, the improvement consisting essentially of:

(a) passing a portion of the void space gas released from the product end of the adsorbent bed during step (3) above to an empty external vessel for the repressurization thereof simultaneously with the passage of another portion of said void space gas directly to another adsorbent bed in the system to be purged during step (3) above: and (b) passing void space gas from the thus-repressurized external vessel to the same adsorbent bed into which void space gas was passed directly during step (3) above, with said passage of gas from the external vessel to said bed occurring immediately after said bed completes said purge step using purge gas provided directly in step (3) above, thus partially repressurizing said purged bed, to a pressure greater than its lower desorption pressure prior to further partial repressurization in step (5) above to upper intermediate pressures by pressure equalization with another bed or beds in the adsorption and subsequent final repressurization to said higher adsorption pressure in step (6) above, whereby the product recovery and/or purity obtained in the system are enhanced.

2. The process of claim 1 in which the adsorption system comprises six adsorbent beds.

3. The process of claim 2 in which two beds are on the adsorption step, in overlapping sequence, during all stages of the overall processing cycle.

4. The process of claim 3 in which each bed undergoes two pressure equalization-repressurization steps subsequent to repressurization from said external vessel and prior to said final repressurization to adsorption pressure.

5. The process of claim 1 in which the adsorption system comprises at least seven adsorption beds, with at least two beds being on adsorption, in overlapping sequence during all stages of the overall processing cycle, with each bed undergoing at least one cocurrent depressurization-pressure equalization directly with another bed before said cocurrent depressurization-provide purge and simultaneously repressurized said external vessel step.

6. The process of claim 5 and including a second cocurrent depressurization-pressure equalization step directly with another bed.

7. The process of claim 6 in which three beds are on adsorption, in overlapping sequence, at all stages of the overall processing cycle.

8. The process of claim 1 in which each adsorbent bed undergoes a processing cycle consisting essentially of:
   (a) adsorption at higher adsorption pressure;
   (b) cocurrent depressurization - direct pressure equalization in which the bed is depressurized from said higher adsorption pressure to an upper intermediate pressure with release of void space gas from the product end thereof, said gas being passed directly to another bed in the system and initially at a lower pressure than said upper intermediate pressure for pressure equalization therebetween at said upper intermediate pressure:
   (c) cocurrent depressurization - provide purge gas in which the bed is depressurized from said upper intermediate pressure to a lower intermediate pressure with release of void space gas from the product end of the bed, a portion of said gas being passed to an empty external vessel for the repressurization thereof simultaneously with the passage of another portion of said void space gas directly to another adsorbed bed in the system to be purged;
   (d) countercurrent depressurization in which the bed is depressurized from said lower intermediate pressure to a lower desorption pressure with release of gas from the feed end of the bed;
   (e) purge at lower desorption pressure with void space gas withdrawn from another adsorbent bed in the system and passed directly to said bed during step (c) of said other adsorbent bed, void space gas from said other adsorbent bed also being simultaneously employed to repressurize said external vessel, said vessel having been emptied subsequent to step (c) above with gas therefrom having been used to partially repressurize the bed to which a portion of void space gas was passed in step (c) above for purge purposes;
   (f) partial repressurization of said bed to a pressure greater than its lower desorption pressure by the passage thereto of void space gas used to repressurize the external vessel during purge step (e) above;
   (g) further partial repressurization of the bed to said upper intermediate pressure by pressure equalization with another bed in the system, said other bed being initially at higher adsorption pressure; and
   (h) final repressurization to adsorption pressure.

9. The process of claim 8 in which four adsorbent beds are employed in said adsorption system.

10. The process of claim 8 in which each bed undergoes a second cocurrent depressurization-direct pressure equalization - prior to the provide purge step and a repressurization by pressure equalization step to partial repressurization from said vessel.

11. The process of claim 10 in which six adsorbent beds are employed said system.

12. The process of claim 10 in which at least seven adsorbent beds employed in said system.

13. The process of claim 12 in which three adsorbent beds are on adsorption, in overlapping sequence, at all stages of the processing cycle.

14. The process of claim 8 in which the product gas withdrawn from the system comprises hydrogen.

15. The process of claim 1 in which the product gas withdrawn from the system comprises hydrogen.

* * * * *